United States Patent
Kayanaka et al.

(10) Patent No.: US 11,407,222 B2
(45) Date of Patent: Aug. 9, 2022

(54) PRINT DEVICE, NON-TRANSITORY COMPUTER-READABLE MEDIUM STORING COMPUTER-READABLE INSTRUCTIONS, AND PRINT METHOD

(71) Applicant: BROTHER KOGYO KABUSHIKI KAISHA, Nagoya (JP)

(72) Inventors: Yoshihisa Kayanaka, Kuwana (JP); Shota Morikawa, Nagoya (JP); Masatoshi Izuchi, Ichinomiya (JP); Takeshi Watanabe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 14 days.

(21) Appl. No.: 17/212,802

(22) Filed: Mar. 25, 2021

(65) Prior Publication Data

US 2021/0402763 A1 Dec. 30, 2021

(30) Foreign Application Priority Data

Jun. 29, 2020 (JP) .............................. JP2020-112166

(51) Int. Cl.
*B41J 2/045* (2006.01)
*G06K 15/10* (2006.01)
*B41J 2/21* (2006.01)

(52) U.S. Cl.
CPC ....... *B41J 2/04586* (2013.01); *B41J 2/04536* (2013.01); *B41J 2/2132* (2013.01); *G06K 15/102* (2013.01)

(58) Field of Classification Search
CPC .. B41J 2/04586; B41J 2/04536; B41J 2/2132; G06K 15/102
See application file for complete search history.

(56) References Cited

U.S. PATENT DOCUMENTS

| | | | |
|---|---|---|---|
| 2010/0214349 A1 | 8/2010 | Ozawa | |
| 2013/0278660 A1* | 10/2013 | Tsuji | ...................... B41J 2/2117 347/14 |
| 2016/0303848 A1 | 10/2016 | Miwa et al. | |

FOREIGN PATENT DOCUMENTS

| | | |
|---|---|---|
| JP | 2008-279726 A | 11/2008 |
| JP | 2016-203389 A | 12/2016 |

OTHER PUBLICATIONS

New U.S. patent application concurrently filed on Mar. 25, 2021 claiming priority to JP Application No. 2020-112164.

\* cited by examiner

*Primary Examiner* — Thinh H Nguyen
(74) *Attorney, Agent, or Firm* — K&L Gates LLP

(57) ABSTRACT

A print device is provided with a background head that discharges a background ink onto a recording medium, a color head that discharges a color ink onto the recording medium, and a CPU that controls the background head and the color head. The CPU of the print device divides the background ink into a plurality of layers including a first background layer and a second background layer, and discharges the background ink from the background head. A first discharge region of the first background layer is further to an inner side than a second discharge region of the second background layer.

11 Claims, 12 Drawing Sheets

PRINT DEVICE, NON-TRANSITORY COMPUTER-READABLE MEDIUM STORING COMPUTER-READABLE INSTRUCTIONS, AND PRINT METHOD

CROSS-REFERENCE TO RELATED APPLICATION

This application claims priority to Japanese Patent Application No. 2020-112166 filed Jun. 29, 2020. The contents of the foregoing application are hereby incorporated herein by reference.

BACKGROUND

The present disclosure relates to a print device, a non-transitory computer-readable medium storing computer-readable instructions, and a print method.

A printing system that is provided with an inkjet printer for white ink and an inkjet printer for color inks is known. The inkjet printer for the white ink discharges the white ink onto a fabric product. The inkjet printer for the color inks discharges the color inks onto a region, of the fabric product, onto which the white ink has been discharged, so as to be superimposed thereon.

SUMMARY

Due to the ink discharged first, there is a case in which the fabric product shrinks. In this case, the color inks that are discharged onto the white ink that is discharged first become displaced, and there is a possibility of the white ink being exposed in relation to the color inks, or of the white ink not being disposed below the color inks.

Embodiments of the broad principles derived herein provide a print device, a non-transitory computer-readable medium storing computer-readable instructions, and a print method that reduce a possibility of white ink being exposed in relation to color inks, and reduce a possibility of the white ink not being disposed below the color inks.

Embodiments provide a print device including a background head configured to discharge a background ink onto a recording medium, a color head configured to discharge a color ink onto the recording medium, a processor; and a memory configured to store computer-readable instructions that, when executed by the processor, perform processes including: dividing the background ink into a plurality of layers including a first background layer and a second background layer, and discharging the background ink from the background head in an order of the first background layer and the second background layer, and causing a first discharge region of the first background layer to be further to an inner side than a second discharge region of the second background layer.

The print device can reduce a possibility of the white ink being exposed in relation to the color inks, or a possibility of the white ink not being disposed below the color inks.

Further, embodiments provide a non-transitory computer-readable medium storing computer-readable instructions that, when executed by a computer that controls a background head configured to discharge a background ink onto a recording medium and a color head configured to discharge a color ink onto the recording medium, cause the computer to perform processes including dividing the background ink into a plurality of layers including a first background layer and a second background layer and discharging the background ink from the background head, and causing a first discharge region of the first background layer to be further to an inner side than a second discharge region of the second background layer. The same effects as those described above can be achieved.

Further, embodiments provide a print method for controlling a background head configured to discharge a background ink onto a recording medium and a color head configured to discharge a color ink onto the recording medium. The method includes dividing the background ink into a plurality of layers including a first background layer and a second background layer and discharging the background ink from the background head, and causing a first discharge region of the first background layer to be further to an inner side than a second discharge region of the second background layer. The same effects as those described above can be achieved.

BRIEF DESCRIPTION OF THE DRAWINGS

Embodiments will be described below in detail with reference to the accompanying drawings in which.

DETAILED DESCRIPTION

Figure 1:
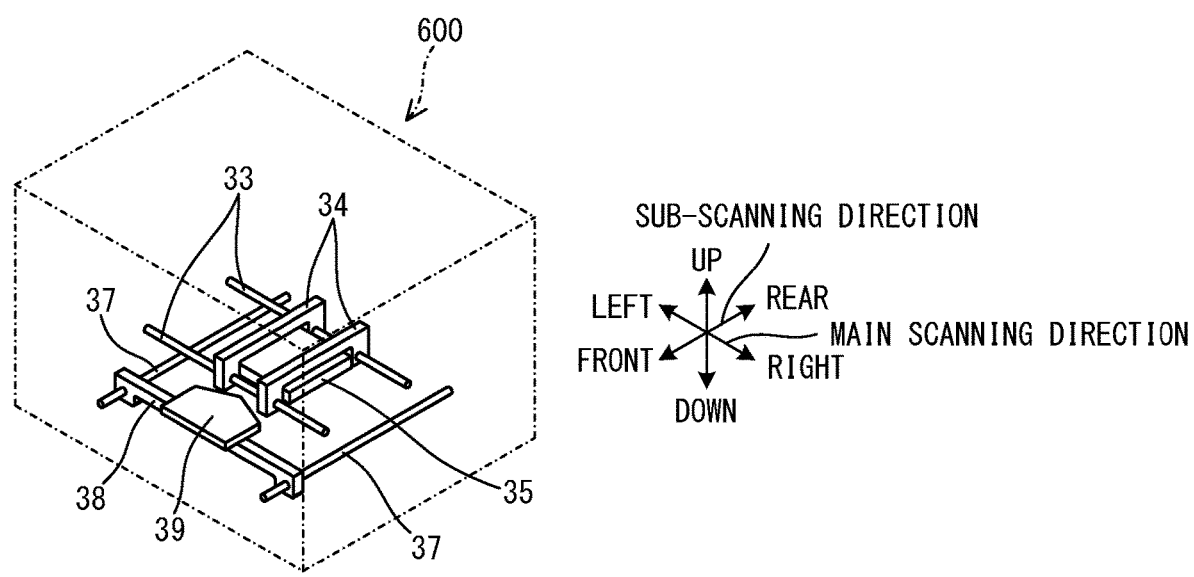
FIG. 1 is a perspective view showing an overall configuration of a print device 600.

A print device 600 shown in FIG. 1 is an inkjet printer, for example, and performs printing by discharging ink onto a recording medium, such as a fabric, paper, or the like. The print device 600 can print a color image on the recording medium using five colors of ink, namely, white (W), black (K), yellow (Y), cyan (C), and magenta (M). The lower left side, the upper right side, the lower right side, the upper left side, the upper side, and the lower side in FIG. 1 are, respectively, a front side, a rear side, a right side, a left side, an upper side, and a lower side of the print device 600.

Hereinafter, of the five color inks, the white ink will be referred to as the white ink, and the four color inks of black, cyan, yellow, and magenta will be referred to collectively as color inks. When the white ink and the color inks are referred to collectively, or no particular distinction is made between the inks, they will be referred to simply as the ink or inks. The white ink is used for printing a background, in order to improve color development of the color inks. The color inks are used for printing a color image by being discharged onto the white ink.

Outline of Print Device 600

The print device 600 is provided with a pair of guide rails 37 that extend in the front-rear direction, at a substantially central portion in the left-right direction. The pair of guide rails 37 support a platen support base 38. A platen 39 is fixed to a substantially central portion, in the left-right direction, of the upper surface of the platen support base 38. A recording medium, such as a T-shirt or the like that is the recording medium, is placed on the upper surface of the platen 39, for example. The platen support base 38 is transported in a sub-scanning direction along the guide rails 37, by a sub-scanning mechanism 210 (refer to FIG. 3) that includes a sub-scanning motor and a belt. In the present embodiment, the sub-scanning direction is the front-rear direction in which the recording medium is transported by the platen 39.

The print device 600 is provided with a pair of guide rails 33 that extend in the left-right direction, in a substantially central portion in the front-rear direction, and above the platen 39. The pair of guide rails 33 support a carriage 34. Eight discharge heads 35 are mounted on a lower portion of the carriage 34. The carriage 34 is transported in a main scanning direction along the guide rails 33, by a main scanning mechanism 220 (refer to FIG. 3) that includes a main scanning motor and a belt. In the present embodiment, the main scanning direction is the left-right direction in which the discharge heads 35 are moved by the carriage 34.

Figure 2:
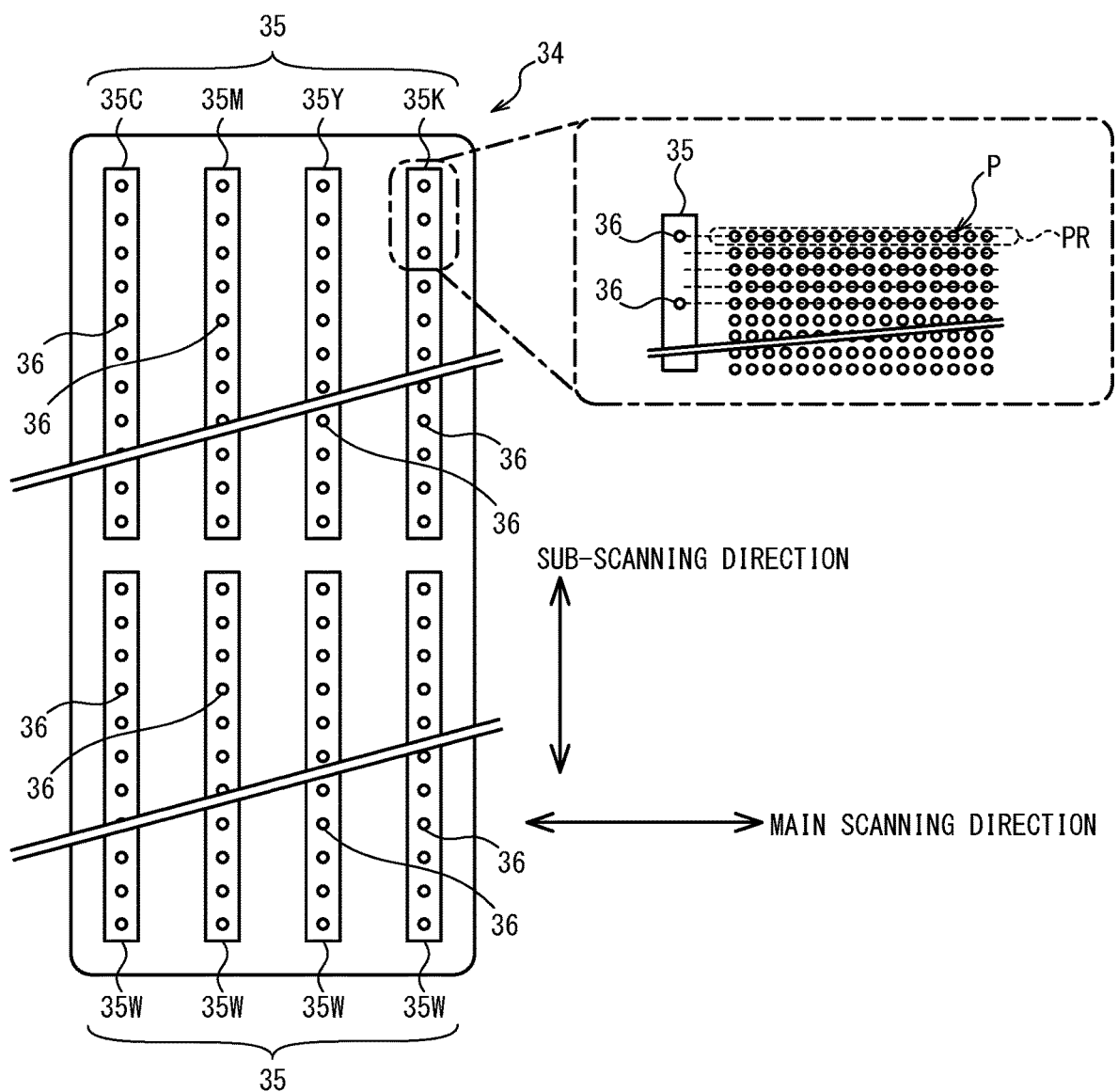
FIG. 2 is a bottom view showing an overall configuration of a carriage 34.

As shown in FIG. 2, the eight discharge heads 35 mounted on the carriage 34 include four discharge heads 35W, and discharge heads 35C, 35M, 35Y, and 35K. 128 discharge ports 36, which are aligned in the sub-scanning direction, are provided in the bottom surface of each of the eight discharge heads 35. The four discharge heads 35W, are separated from the discharge heads 35C, 35M, 35Y, and 35K in the sub-scanning direction. Note that, in FIG. 2, in order to simplify the explanation, the number of discharge ports 36 illustrated is less than the actual number of discharge ports 36. The discharge ports 36 can respectively discharge the inks.

The four discharge heads 35W are aligned in the main scanning direction, and are mounted on the carriage 34. The discharge ports 36 of the four discharge heads 35W discharge the white ink. In a similar manner, the discharge heads 35C, 35M, 35Y, and 35K are also aligned in the main scanning direction and are mounted on the carriage 34. The discharge ports of the discharge heads 35C, 35M, 35Y, and 35K discharge the cyan ink, the magenta ink, the yellow ink, and the black ink, respectively.

The print device 600 forms ink dot rows PR that are aligned in the main scanning direction, by discharging the inks from the discharge heads 35 while causing the carriage 34 to scan in the main scanning direction. When the printing of the dot row PR by a single scan ends, the print device 600 moves the platen 39 in the sub-scanning direction, and once more prints the dot row PR by the single scan. The print device 600 forms a plurality of the dot rows PR on the recording medium by repeatedly performing the above operation in accordance with print data. In this way, a print image is printed, on the recording medium, in which dots P are aligned in the main scanning direction and the sub-scanning direction, respectively. The discharge ports 36 of the discharge heads 35 are disposed at intervals of 4 rows in the lines of the dots P in the sub-scanning direction. As described above, a density per inch in the sub-scanning direction of the dots formed by the inks discharged from the discharge heads 35 is 1200 dpi. Thus, the interval between the discharge ports 36 in the sub-scanning direction is 1/(1200/4) (inches).

The present disclosure can also be applied to a case in which printing is performed in which the discharge heads 35 do not move and the platen 39 moves in the main scanning direction. In other words, it is sufficient that the print device 600 cause the discharge heads 35 and the platen 39 to move relative to each other. Further, the present disclosure can be applied to a case in which the discharge heads 35 are provided with the plurality of discharge ports 36 aligned in the main scanning direction, and the printing is performed without moving the carriage 34 in the main scanning direction.

Electrical Configuration of Print Device 600

Figure 3:
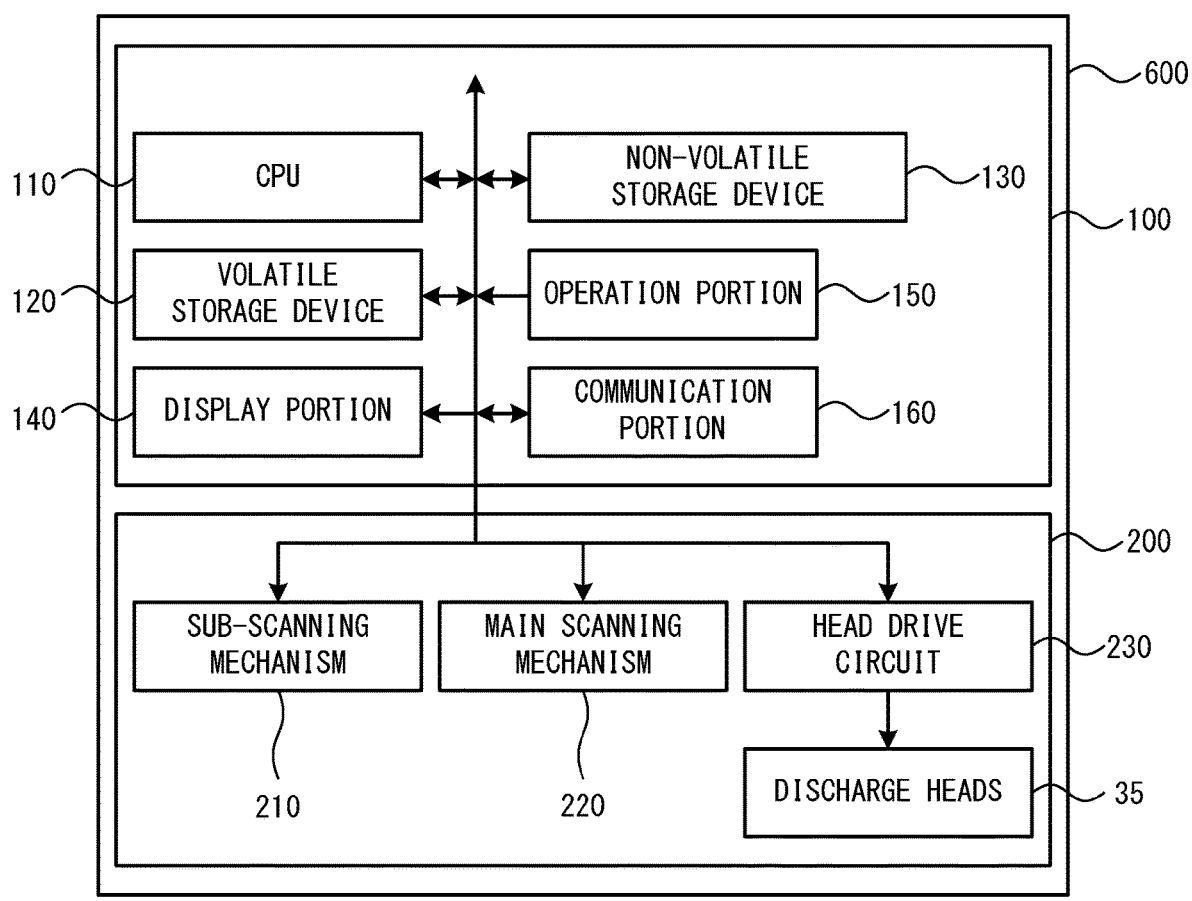
FIG. 3 is a block diagram showing an electrical configuration of the print device 600.

As shown in FIG. 3, the print device 600 is provided with a control device 100 that performs overall control of the print device 600, and a printing mechanism 200 as a printing execution portion.

The control device 100 is provided with a CPU 110 that is a controller, a volatile storage device 120, such as a DRAM or the like, a non-volatile storage device 130, such as a flash memory, a hard disk drive, or the like, a display portion 140, such as a liquid crystal display or the like, an operation portion 150 that includes a touch panel overlaid on the liquid crystal display, buttons, or the like, and a communication portion 160 that includes a communication interface for communication with an external device, such as a personal computer (not shown in the drawings) or the like.

The volatile storage device 120 temporarily stores various intermediate data generated when the CPU 110 performs processing. The non-volatile storage device 130 stores a print data creation program, the print data, image data, and order information. The print data creation program creates the print data and controls the printing mechanism 200, as a result of being executed by the CPU 110. The print data creation program is stored in the non-volatile storage device 130 in advance, before shipment of the print device 600. The print data creation program is supplied in a mode of being stored in a CD-ROM of the like, or in a mode of being downloaded from a server. The CPU 110 executes the print data creation program and performs control processing to be described later (refer to FIG. 5). The print data is data of the print image to be printed using the printing mechanism 200. The order information prescribes an order when printing the print data.

The printing mechanism 200 performs the printing in accordance with the control of the CPU 110, by discharging the cyan ink, the magenta ink, the yellow in, the black ink, and the white ink from the discharge heads 35. The printing mechanism 200 is provided with the sub-scanning mechanism 210, the main scanning mechanism 220, a head drive circuit 230, and the discharge heads 35. The head drive circuit 230 drives the discharge heads 35.

Print Image and Print Data

Print data D11 that prints a background image W11, which is a white print image obtained by discharging the white ink from the four discharge heads 35W, will be explained as an example of the print data. The print data D11 includes information indicating positions at which the dots are to be formed in the background image W11 (hereinafter referred to as "dot positions"), and information indicating positions at which the dots are not to be formed.

Figure 4:
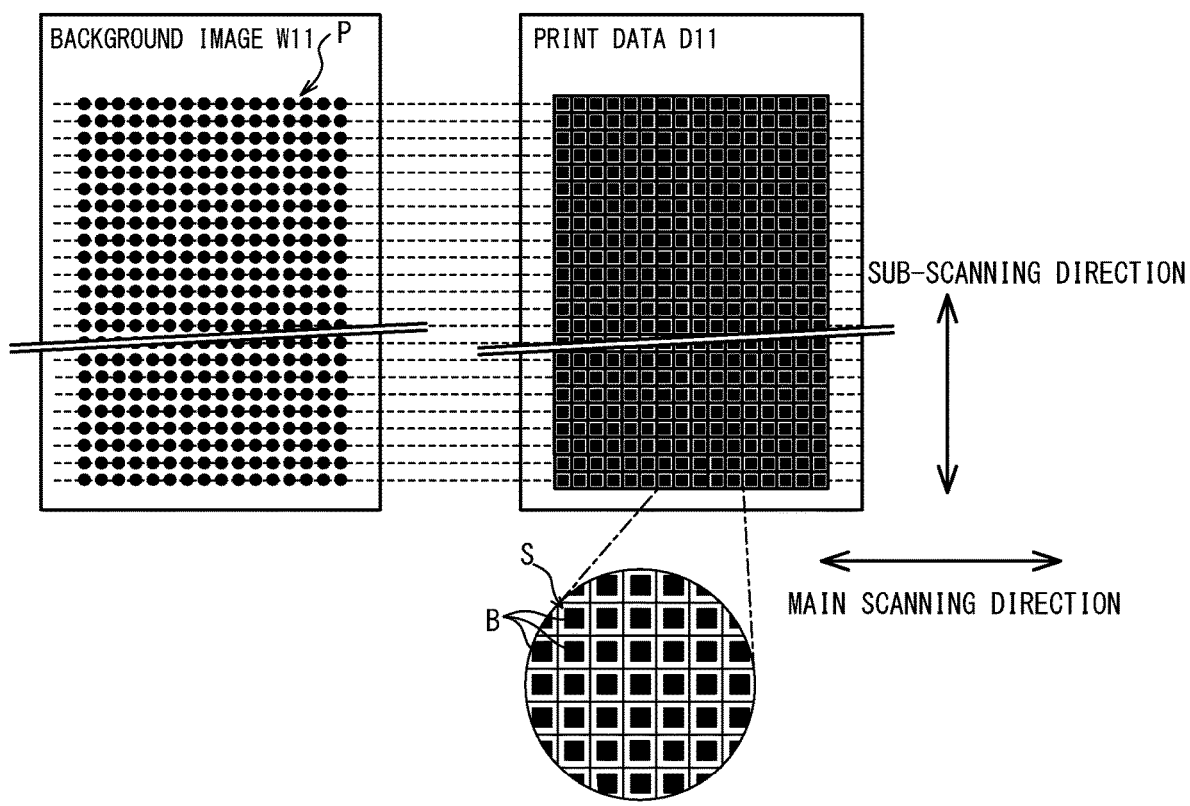
FIG. 4 is a diagram showing a background image W11, and a concept diagram of print data D11.

In FIG. 4, the print data D11 is conceptually illustrated. Of the print data D11, each of a plurality of regions S that are demarcated in a lattice shape indicates all the positions at which the discharge of the ink from the discharge heads 35 is possible. Further, of the plurality of regions S, the positions of the regions S in which square marks B that are colored black are disposed indicate the dot positions. In the print data D11 shown in FIG. 4, the marks B are disposed in all of the plurality of regions S. In this case, in the actual print data D11, information is included in which all the positions at which the discharge of the ink from the discharge heads 35W is possible are set as the dot positions.

When printing is performed using the four discharge heads 35W, and the discharge heads 35C, 35M, 35Y, and 35K, print data common to the four discharge heads 35W, and four sets of print data corresponding to each of the discharge heads 35C, 35M, 35Y, and 35K are created. The CPU 110 performs discharge control of the white ink from the four discharge heads 35W on the basis of the print data common to each of the four discharge heads 35W. In this case, the white ink is discharged from the discharge ports 36 of each of the four discharge heads 35W at the dot positions indicated by the print data. In this way, the dots of the white ink are formed, and the white ink background image is printed on the recording medium. Note that the present disclosure can also be applied to the print device 600 including one to three, or five or more of the discharge heads 35W.

Further, the CPU 110 performs the discharge control of the color inks from the discharge heads 35C, 35M, 35Y, and 35K, on the basis of the four sets of print data corresponding to each of the discharge heads 35C, 35M, 35Y, and 35K. In this case, the color inks are discharged from the discharge ports 36 of each of the discharge heads 35C, 35M, 35Y, and 35K at the dot positions indicated by the print data. In this way, the dots of the color inks are formed in a superimposed manner on the dots of the white ink, and a color image, which is the print image of the color inks, is printed on the recording medium. In other words, the background image of the white ink is used as a base of the color image of the color inks. Note that the white ink for forming the background image is not discharged at positions at which the color inks are not discharged.

As shown in FIG. 2, the four discharge heads 35W that discharge the white ink are separated from the discharge heads 35C, 35M, 35Y, and 35K that discharge the color inks in the sub-scanning direction. When a timing at which the white ink is discharged from the four discharge heads 35W and a timing at which the color inks are discharged from the discharge heads 35C, 35M, 35Y, and 35K match each other, each of positions of the background image printed by the discharge of the white ink and of the color image printed by the discharge of the color inks become displaced in the sub-scanning direction. Therefore, on the basis of the interval, in the sub-scanning direction, between the four discharge heads 35W and the discharge heads 35C, 35M, 35Y, and 35K, on the number of the discharge ports 36, and on the interval between the discharge ports 36, the CPU 110 calculates an offset amount required for the printing in which the color image is superimposed on the background image. The CPU 110 applies the offset amount to the dot positions in the print data of the color image, and corrects the print data. The CPU 110 refers to the corrected print data, and discharges the color inks from the discharge heads 35. In this way, the CPU 110 performs the printing such that the color image is superimposed on the background image.

Overview of Control Processing

When a user performs an operation to input a print command on the operation port 150, the CPU 110 of the control device 100 receives the print command from the operation portion 150. The print command includes at least instructions specifying the print data indicating the print image, instructions specifying a print method, and instructions specifying a standby time. The print method indicates one of a first print method or a second print method. The first print method is a print method when printing is performed on a recording medium of a material that is relatively likely to shrink due to the attachment of ink, or a material that requires printing using a relatively large amount of ink. The second print method is a print method when printing is performed on a recording medium of a material that is relatively unlikely to shrink due to the attachment of the ink, or a material that requires printing using a relatively small amount of ink. The standby time indicates a time period from when the printing of the background image ends to when the printing of the color image starts.

When the print command is received from the operation portion 150, the CPU 110 executes the print data creation program stored in the non-volatile storage device 130. In this way, the CPU 110 executes the control processing that creates the print data and causes the printing mechanism 200 to perform the printing.

Figure 5:
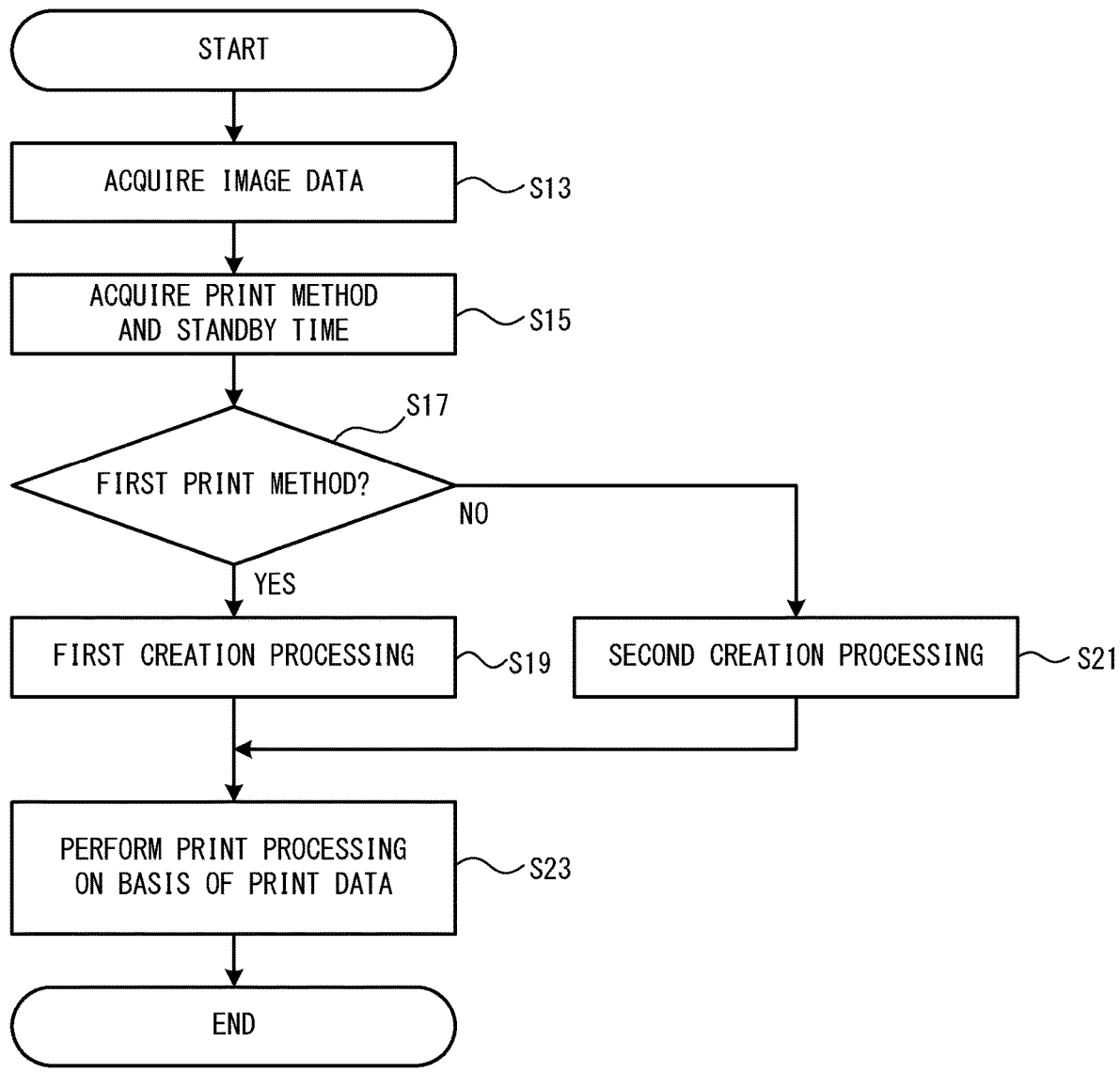
FIG. 5 is a flowchart of control processing.

As shown in FIG. 5, first, the CPU 110 acquires, from the non-volatile storage device 130, the image data specified by the received print command (step S13). Next, the CPU 110 acquires the print method and the standby period specified by the received print command (step S15).

The CPU 110 determines whether the print method specified by the received print command is the first print method (step S17). When the CPU 110 determines that the specified print method is the first print method (yes at step S17), on the basis of the acquired print data, the CPU 110 executes creation processing (first creation processing) that creates the print data using the first print method (step S19). On the other hand, when the CPU 110 determines that the specified print method is the second print method (no at step S17), on the basis of the acquired print data, the CPU 110 executes creation processing (second creation processing) that creates the print data using the second print method (step S21). The first creation processing and the second creating processing will be described in detail later. The CPU 110 controls the printing mechanism 200 on the basis of the print data created by the first creation processing or the second creation processing, and executes print processing (step S23). After ending the print processing, the CPU 110 ends the control processing.

Hereinafter, the print processing executed on the basis of the print data created by the first creation processing will be referred to as "first print processing." The print processing executed on the basis of the print data created by the second creation processing will be referred to as "second print processing." The first creation processing and the first print processing will be collectively referred to as "first processing," and the second creation processing and the second print processing will be collectively referred to as "second processing."

An example of the second processing (step S21, step S23, refer to FIG. 5) will be explained with reference to FIG. 6. Note that, hereinafter, a case is assumed in which the background image W11 shown in FIG. 4 is extracted and used, from the print image represented by the image data acquired by the processing at step S13. Further, in order to simplify the explanation, a case is exemplified in which the print processing is performed by the discharge heads 35W including four of the discharge ports 36, which is a number smaller than the actual number (128) of the discharge ports 36. Furthermore, in FIG. 6, the four discharge heads 35W aligned in the main scanning direction are represented by the single discharge head 35W.

First, in the second creation processing (step S21, refer to FIG. 5), the CPU 110 creates the print data D11 shown in FIG. 4, as the print data that prints the background image W11 using the four discharge heads 35W. Next, the CPU 110 controls the printing mechanism 200 in the following manner, on the basis of the created print data D11, and executes the second print processing (step S23, refer to FIG. 5).

Figure 6:
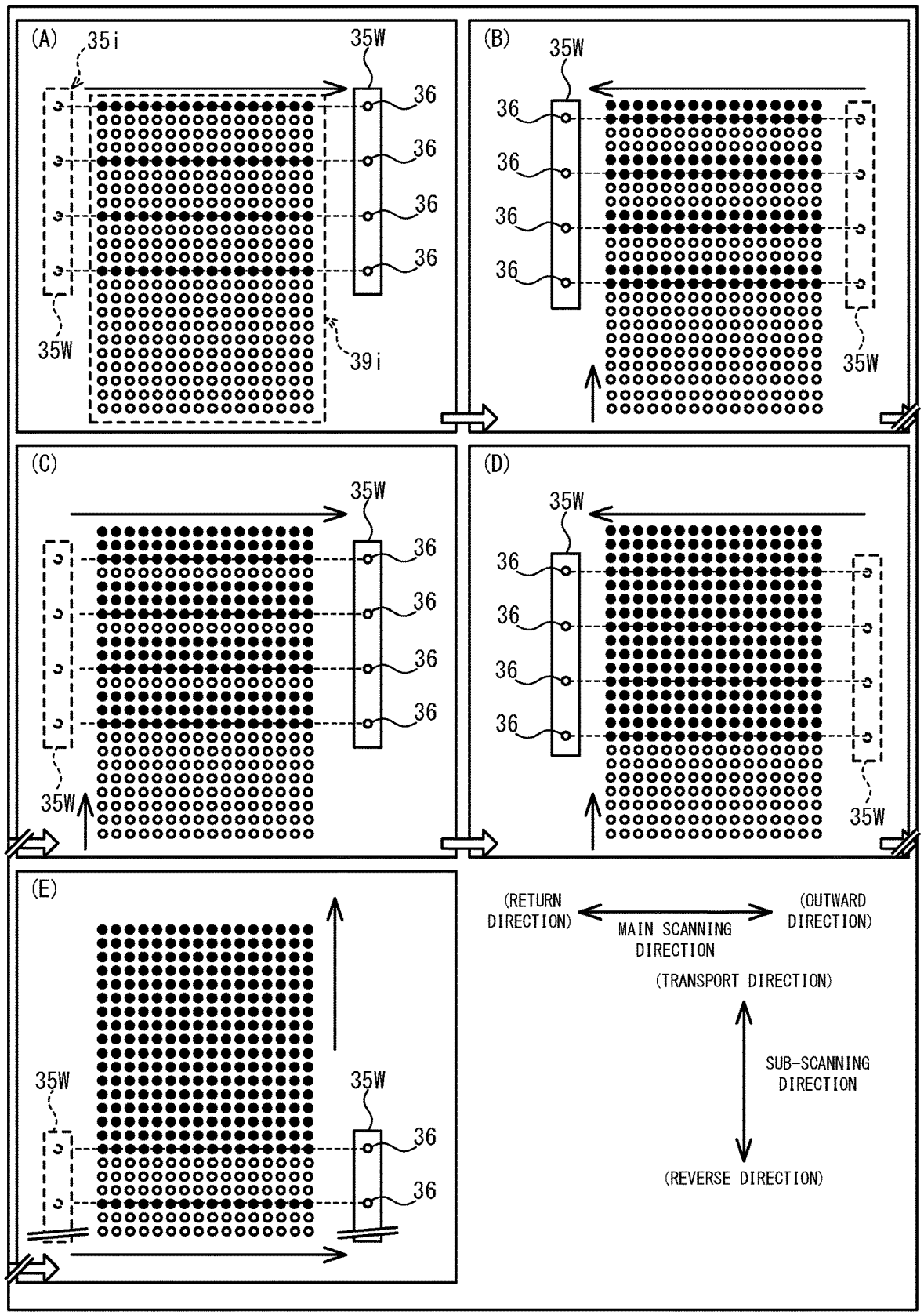
FIG. 6 is an explanatory diagram of a case in which the background image W11 is printed once.

As shown in step (A) of FIG. 6 the CPU 110 transports the carriage 34 (refer to FIG. 2) and moves the four discharge heads 35W in the main scanning direction relative to the platen 39, and disposes the discharge heads 35W in a predetermined head initial position 35i. Further, the CPU 110 moves the platen 39 in the sub-scanning direction relative to the carriage 34, and disposes the platen 39 in a predetermined platen initial position 39i. The CPU 110 discharges the white ink from the discharge ports 36 while moving the four discharge heads 35W in an outward direction that is one side in the main scanning direction. In this way, the CPU 110 forms four of the dot rows, such that the dots are aligned in the main scanning direction and, in the sub-scanning direction, are in four rows (a first row, a fifth row, a ninth row, and a thirteenth row) separated by four dots at a time. At this time, the CPU 110 refers to the dot positions (the first row, the fifth row, the ninth row, and the thirteenth row) of the print data D11 (refer to FIG. 4), and discharges the white ink from the four discharge ports 36 of each of the four discharge heads 35W.

After forming the dot rows in each of the first row, the fifth row, the ninth row, and the thirteenth row, as shown in step (B) of FIG. 6, the CPU 110 moves the platen 39 in a transport direction that is one side in the sub-scanning direction, by an amount corresponding to one dot. The CPU 110 discharges the white ink from the discharge ports 36 while moving the four discharge heads 35W in a return direction that is opposite to the outward direction. In this way, the CPU 110 forms four of the dot rows, such that the dots are aligned in the main scanning direction and, in the sub-scanning direction, are in four rows (a second row, a sixth row, a tenth row, and a fourteenth row) separated by four dots at a time. At this time, the CPU 110 refers to the dot positions (the second row, the sixth row, the tenth row, and the fourteenth row) of the print data D11, and discharges the white ink from the four discharge ports 36 of each of the four discharge heads 35W.

After forming the dot rows in each of the second row, the sixth row, the tenth row, and the fourteenth row, as shown in step (C) of FIG. 6, the CPU 110 moves the platen 39 in the transport direction by the amount corresponding to one dot. The CPU 110 discharges the white ink from the discharge ports 36 while moving the four discharge heads 35W in the outward direction. In this way, the CPU 110 forms four of the dot rows, such that the dots are aligned in the main scanning direction and, in the sub-scanning direction, are in four rows (a third row, a seventh row, an eleventh row, and a fifteenth row) separated by four dots at a time. After forming the dot rows in each of the third row, the seventh row, the eleventh row, and the fifteenth row, as shown in step (D) of FIG. 6, the CPU 110 moves the platen 39 in the transport direction by the amount corresponding to one dot. The CPU 110 discharges the white ink from the discharge ports 36 while moving the four discharge heads 35W in the return direction. In this way, the CPU 110 forms four of the dot rows, such that the dots are aligned in the main scanning direction and, in the sub-scanning direction, are in four rows (a fourth row, an eighth row, a twelfth row, and a sixteenth row) separated by four dots at a time. In this manner, the first row to the sixteenth row are filled in by the 16 dot rows.

Next, as shown in step (E) of FIG. 6, the CPU 110 moves the platen 39 in the transport direction by an amount corresponding to a length of the discharge head 35. The length of the discharge head 35 here corresponds to a length between the first row and the sixteenth row. Note that the platen 39 has already moved by an amount corresponding to three dots in the transport direction, between steps (A) to (D) of FIG. 6. Thus, more specifically, the above-described movement distance of the platen 39 matches a value obtained by subtracting three dots from the length of the discharge heads 35. After that, using the same method used to form the sixteen dot rows of the first row to the sixteenth row, the CPU 110 forms sixteen dot rows of a seventeenth dot row to a thirty-second dot row. After this, the processing is continued until the white ink is discharged to all the dot positions in the print data D11. In this way, the background image W11 is printed on the recording medium.

Note that, although details are omitted here, the CPU 110 extracts a cyan image, a magenta image, a yellow image, and a black image from the print image, and creates the print data that prints each of the extracted images. The CPU 110 controls the printing mechanism 200 on the basis of the created print data. In this way, after the standby time included in the print command has elapsed from when the printing of the background image W11 is complete, the CPU 110 discharges the color inks from the discharge heads 35C, 35M, 35Y, and 35K on the position formed by the white ink dots, and prints the color image on the recording medium. In this way, the background image and the color image are printed in the superimposed manner.

Hereinafter, an ink amount ratio will be used as parameters representing a resolution of the print image. The ink amount ratio is a ratio (%) of the amount of ink discharged when the background image is printed. For example, when the background image W11 is printed, the ink amount ratio of the ink discharged from each of the four discharge heads 35W is 100%. In this case, the ink amount ratio of the background image W11 is 400% (100%+100%+100%+100%).

Note that the parameters indicating the resolution of the print image are not limited to the ink amount ratio as a parameter indicating the resolution of the print image, another parameter may be used that indicates to what degree of ink density the print image is formed. For example, a total number of dots of the entire print image, a total number of dot rows, a total ink amount (the total number of dots× an ink amount per dot), or the like may be used as the resolution.

Another example of the second processing (step S21, step S23, refer to FIG. 5) will be explained with reference to FIG. 7. First, in the second creation processing (step S21, refer to FIG. 5), the CPU 110 creates the print data D11 on the basis of the background image W11. In the print data D11, information is included to set all of the positions at which the ink from the discharge heads 35W can be discharged as the dot positions. Thus, in the concept diagram of the print data D11 shown in steps (A) and (B) of FIG. 7, the marks B are disposed in all of the regions S. Furthermore, the CPU 110 creates print data D23 for printing a color image C23. The print data D23, information is included to set all of the position at which the ink from the discharge heads 35C, 35M, 35Y, and 35K can be discharged as the dot positions.

Figure 7:
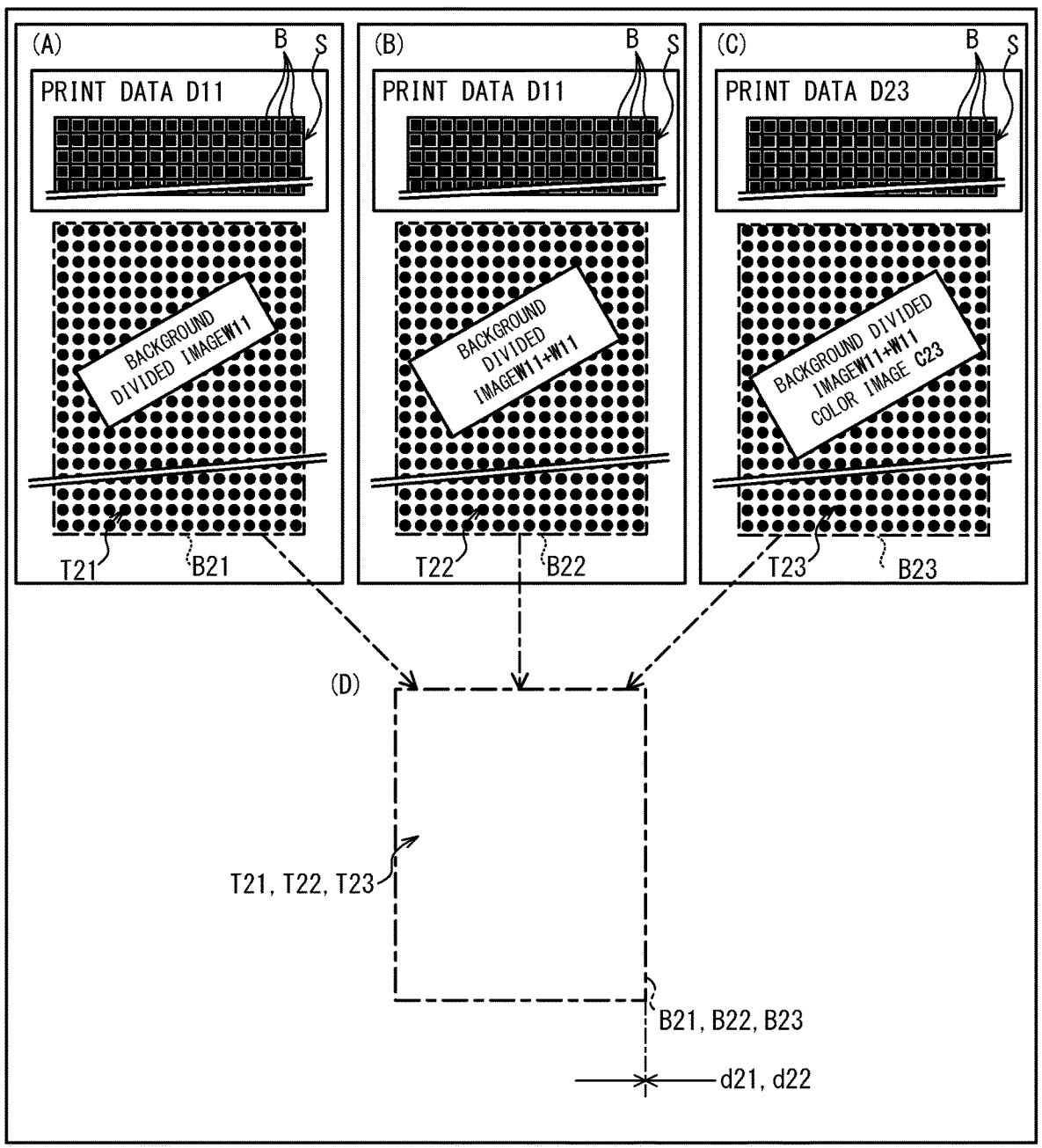
FIG. 7 is an explanatory diagram of a case in which the background image W11 is printed twice.

Thus, in the concept diagram of the print data D23 shown in step (C) of FIG. 7, the marks B are disposed in all of the regions S.

Furthermore, the CPU 110 acquires, from the non-volatile storage device 130, the order information indicating the order when performing the printing on the basis of the created print data D11 and D23. In the present example, in the order information, it is assumed that the print data D11 is set to be first and second in the printing order, and the print data D23 is set to be third in the printing order. The CPU 110 sets the printing order for the print data D11 and D23. Furthermore, the CPU 110 sets the standby time acquired in processing at step S15 of control processing (refer to FIG. 5) in the print data D23.

Next, the CPU 110 controls the printing mechanism 200 in the following manner on the basis of the created print data D11 and D23, and executes the second print processing (step S23, refer to FIG. 5).

First, the CPU 110 disposes the carriage 34 in the head initial position 35i. Alternatively, the CPU 110 disposes the platen 39 in the platen initial position 39i. The CPU 110 discharges the white ink from the four discharge heads 35W, on the basis of the divided print data D11 that is first in the printing order, while moving the four discharge heads 35W in the main scanning direction. Next, the CPU 110 moves the platen 39 in the transport direction. As a result of the CPU 110 repeating the above-described processing, as shown in step (A) of FIG. 7, the background image W11 is printed on the recording medium. Next, the CPU 110 returns the discharge heads 35 to the head initial position 35i, moves the platen 39 in a reverse direction that is another side in the sub-scanning direction, and returns the platen 39 to a position offset by 1 dot in the transport direction with respect to the platen initial position 39i.

Next, the CPU 110 discharges the white ink from the four discharge heads 35W, on the basis of the print data D11 that is second in the printing order, while moving the four discharge heads 35W in the main scanning direction. In this way, as shown in step (B) of FIG. 7, the background image W11 is printed on the recording medium. As a result, a state is obtained in which the background image W11 is printed twice on the recording medium in a superimposed manner.

Note that the ink amount ratio of the background image W11 is 400%. Thus, the ink amount ratio when the background image W11 is printed twice is 800% (400%+400%), and is greater than the ink amount ratio of the background image W11 (refer to FIG. 4).

Next, before starting the printing on the basis of the print data D23, the CPU 110 returns the discharge heads 35 to the head initial position 35i, and returns the platen 39 to the platen initial position 39i. After the printing of the background image W11 is complete, the CPU 110 stands by for an amount of time corresponding to the standby time set in the print data D23. After that, the CPU 110 discharges the color ink from the discharge heads 35C, 35M, 35Y, and 35K on the basis of the print data D23 that is third in the printing order, while moving the discharge heads 35C, 35M, 35Y, and 35K in the main scanning direction. In this way, as shown in step (C) FIG. 7, the color image C23 is printed on the recording medium so as to be superimposed on the background divided images W11.

Note that, in the second processing, a command specifying one of when to print the background image W11 once (refer to FIG. 6), and when to print the background image W11 twice (refer to FIG. 7) is included in a print method received by the processing at step S15 of the control processing (refer to FIG. 5). In this case, the CPU 110 determines which of the second processing to perform, on the basis of the command included in the received print command.

Hereinafter, as shown in step (A) of FIG. 7, for the background image W11 printed first, a discharge region of the discharged white ink will be referred to as a first discharge region T21, and a boundary position between a region on which the white ink is not discharged and the first discharge region T21 will be referred to as a first background boundary position B21. A layer of the white ink with which the background image W11 that is printed first is printed will be referred to as a first background layer. As shown in step (B) of FIG. 7, for the background image W11 that is printed second, a discharge region of the discharged white ink will be referred to as a second discharge region T22, and a boundary position between a region on which the white ink is not discharged and the second discharge region T22 will be referred to as a second background boundary position B22. A layer of the white ink with which the background image W11 that is printed second is printed will be referred to as a second background layer. The second background layer is layered on top of the first background layer. As shown in step (C) of FIG. 7, for the color image C23, a discharge region of the discharged color inks will be referred to as a color region T23, and a boundary position between a region on which the color inks are not discharged and the color region T23 will be referred to as a color boundary position B23. The layer of the color inks with which the color region T23 is formed will be referred to as a color layer. The color layer is layered on top of the second background layer.

The background image W11 and the color image C23 are both printed as a result of dots being formed in all of positions at which the discharge of the ink from the discharge heads 35 is possible. Thus, as shown in step (D) of FIG. 7, the first discharge region T21, the second discharge region T22, and the color region T23 are superimposed on each other, and positions of the first background boundary position B21, the second background boundary position B22, and the color boundary position B23 are aligned with each other. Therefore, a gap between the first background boundary position B21 and the second background boundary position B22, and a gap between the second background boundary position B22 and the color boundary position B23 are both zero. Hereinafter, when the printing is performed using the second print method in the second processing, the gap between the first background boundary position B21 and the second background boundary position B22 will be referred to as a second gap d21, and the gap between the second background boundary position B22 and the color boundary position B23 will be referred to as a second gap d22.

A user may include, in the print command, a command specifying the second gaps d21 and d22. The CPU 110 may create the print data from the background image W11 and the color image C23 on the basis of the second gaps d21 and d22 specified by the received print command.

First Working Example

A first working example, which is an example of the first processing (step S19, step S23, refer to FIG. 5) will be explained with reference to FIG. 8. The first working example differs from the second processing in that background divided images are created on the basis of the background image W11, and the print data is created.

Hereinafter, a description of processing that is the same as that of the second processing will be simplified.

First, in the first creation processing (step S19, refer to FIG. 5), the CPU 110 creates background divided images W31 and W32 on the basis of the background image W11 shown in FIG. 4. As shown in step (A) of FIG. 8, in the background divided image W31 of the background image W11, dots of two rows at both ends in the main scanning direction, and dots of two rows at both ends in the transport direction are not formed. As shown in step (B) of FIG. 8, in the background divided image S32, of the background image W11, dots of one row at both ends in the main scanning direction, and dots of one row at both ends in the transport direction are not formed. Note that, both the ends in the transport direction and the main scanning direction of each of the background divided images W31 and W32 are disposed along both ends of the color image C23 in the transport direction and the main scanning direction. Compared to the background image W11, an ink amount ratio of the background divided images W31 and W32 becomes smaller by an amount corresponding to the number of dots that are not formed at both the ends in the main scanning direction and the transport direction, respectively.

The CPU 110 creates divided print data D31 and D32 from the background divided images W31 and W32. In the divided print data D31 and D32, information is included in which, of all the positions at which the discharge of the ink from the discharge heads 35W is possible, positions excluding part of both end portions in the main scanning direction and the transport direction, respectively, are set as the dot positions. As a result, in concept diagrams of the divided print data D31 and D32 shown in steps (A) and (B) of FIG. 8, the marks B are assigned to the regions S excluding part of both end portions in the main scanning direction and the transport direction, respectively. Further, as shown in step (C) of FIG. 8, the CPU 110 creates print data D23 used to print the color image C23. The color image C23 and the print data D23 are the same as in the second processing (refer to FIG. 7). Furthermore, the CPU 110 acquires, from the non-volatile storage device 130, order information indicating the order when performing the printing on the basis of the created divided print data D31 and D32, and the created print data D23. In the first working example, in the order information, it is assumed that the divided print data D31 is set to be first in a printing order, the divided print data D32 is set to be second in the printing order, and the print data D23 is set to be third in the printing order. The CPU 110 sets the printing order for the divided print data D31 and D32, and the print data D23. Furthermore, the CPU 110 sets the standby time acquired in the processing at step S15 of the control processing (refer to FIG. 5) in the print data D23.

Next, the CPU 110 controls the printing mechanism 200 on the basis of the created divided print data D31 and D32 and the created print data D23, and executes the first print processing (step S23, refer to FIG. 5). As shown in step (A) of FIG. 8, in the first print processing, the CPU 110 discharges the white ink from the discharge heads 35 on the basis of the divided print data D32 that is first in the printing order, and prints the background divided image W31 on the first background layer. Next, as shown in step (B) of FIG. 8, the CPU 110 discharges the white ink from the discharge heads 35 on the basis of the divided print data D31 that is second in the printing order, and prints the background divided image W32 on the second background layer. In this case, a first discharge region T31 of the first background layer onto which the white ink is discharged when printing the background divided image W31 is positioned further to the inside of the background divided image W32 than a second discharge region T32 of the second background layer onto which the white ink is discharged when printing the background divided image W32. A gap between a first background boundary position B31 and a second background boundary position B32 of the first discharge region T31 is larger than zero. Hereinafter, the gap between the first background boundary position B31 and the second background boundary position B32 when printing using the first print method in the first processing will be referred to as a first gap d11. The first gap d11 is larger than the second gap d21 (refer to FIG. 7).

Next, after the printing of the background divided image W32 is complete, the CPU 110 stands by for an amount of time corresponding to the standby time set in the print data D23. After that, as shown in step (C) of FIG. 8, the CPU 110 discharges the color inks from the discharge heads 35 on the basis of the print data D23 that is third in the printing order, and prints the color image C23. In this case, the second discharge region T32 of the second background layer onto which the white ink is discharged when printing the background divided image W32 is positioned further to the inside of the color image C23 than the color region T23 of the color layer onto which the color inks are discharged when printing the color image C23. The gap between the second background boundary position B32 of the second discharge region T32 and the color boundary position B23 is larger than zero. Hereinafter, the gap between the second background boundary position B32 and the color boundary position B23 will be referred to as a first gap d12. The first gap d12 is larger than the second gap d22 (refer to step (D) of FIG. 7).

Further, "to the inside" described above indicates an interior side of a region encompassed by the color boundary position B23 of the color image C23. Thus, the first discharge region T31 is positioned further to the inside than the second discharge region T32 means, in other words, that the first discharge region T31 is positioned further to the interior side of the color boundary position B23 of the color image C23 than the second discharge region T32. Note that a positional relationship of the first discharge region T31, the second discharge region T32, and the color image C23 is also applied to the following second to fourth working examples.

Actions and Effects of First Working Example

The print device 600 prints the background divided image W31 on the first discharge region T31 that is disposed further to the inside than the second discharge region T32, that is, prints the background divided image W32 on the second discharge region T32 that is disposed further to the outside than the first discharge region T31. As a result, the recording medium first shrinks, and after that, the print device 600 prints the background divided image W32. When the background divided images W31 and W32 are printed at the same timing, there is an increased possibility that the color image C23 may protrude with respect to the background divided images W31 and W32 and the white ink may be exposed, or, in contrast, the background divided images W31 and W32 may not be arranged below the color image C23, or the like. On the other hand, as in the first working example, when the background divided image W32 is printed after the background divided image W31, for example, the recording medium shrinks due to the background divided image W31 that is printed first. Thus, even when the second discharge region T32 of the background divided image W32 is arranged further to the outside than the first discharge region T31 of the background divided image W31, the possibility that the color image C23 may protrude with respect to the background divided images W31 and W32 and the white ink may be exposed, or, in contrast, the background divided images W31 and W32 may not be arranged below the color image C23, or the like, can be reduced, compared to the case in which the background divided images W31 and W32 are printed at the same timing.

Further, the second discharge region T32 of the second background layer is arranged further to the inside of the color image C23 than the color region T23 of the color layer. In this way, the print device 600 can reduce a possibility of the white ink being exposed to the surface, even when the recording medium shrinks and the color inks are displaced with respect to the white ink.

The CPU 110 switches between performing the first processing and the second processing on the basis of the print method specified by the print command received from the operation portion 150. For example, when printing on the recording medium that is likely to shrink, or when printing using a large amount of ink is required, the user specifies the first processing. In this case, even when the recording medium shrinks and the color inks are displaced with respect to the white ink, the print device 600 can reduce the possibility of the white ink being exposed to the surface. Further, an ink amount of the white ink used for printing the background image can be made larger than when performing the second processing. On the other hand, when printing on the recording medium that is not likely to shrink, or when printing using a small amount of ink is required, the user specifies, of the second processing, the print processing that prints the background image W11 once. In this case, the time required for the printing can be shortened compared to when the first processing is performed.

Of the second processing, in the case of printing the background image W11 twice in the superimposed manner, the first discharge region T21 onto which the white ink is discharged in order to print the background image W11 that is printed first, the second discharge region T22 onto which the white ink is discharged in order to print the background image W11 that is printed second, and the color region T23 onto which the color inks are discharged in order to print the color image C23 may be different from each other. In this case, the second gap d21 between the first background boundary position B21 and the second background boundary position B22 may be changed within a range smaller than the first gap d11. Similarly, the second gap d22 between the second background boundary position B22 and the color boundary position B23 may be changed within a range smaller than the first gap d12. In the first working example, the second discharge region T32 and the color region T23 may be aligned with each other. In other words, the first gap d12 may be zero.

In the first working example, the CPU 110 may change the size of the region in which the dots are not formed at both the end portions of the background divided image W32 in the main scanning direction and the transport direction (hereinafter referred to as a prohibited region) in accordance with the ink amount of the white ink used in the printing of the background divided image W32. More specifically, the CPU 110 may increase the size of the prohibited region the greater the ink amount of the white ink used in printing the background divided image W32. Note that the amount of the white ink used in printing the background divided image W32 can be identified by creating the divided print data D32.

In this case, when the color image C23 is printed, the first gap d12 between the second background boundary position B32 and the color boundary position B23 becomes larger the greater the ink amount of the white ink used in printing the background divided image W32. Note that a displacement in the positional relationship between the second discharge region T32 and the color region T23 becomes larger the greater the amount of the white ink used. Thus, the CPU 110 makes the first gap d12 between the color boundary position B23 and the second background boundary position B32 larger the greater the amount of the white ink used. In this way, the CPU 110 can suppress the displacement in the positional relationship between the white ink and the color inks.

The print device 600 may include a camera that captures an image of the recording medium. The CPU 110 may identify the type of the recording medium on the basis of a captured image of the recording medium obtained by the image capture by the camera. For example, identification information (a tag attached to the recording medium, for example) indicating the type may be attached to the recording medium. The CPU 110 may identify the type of the recording medium from the identification information included in the captured image of the recording medium. The CPU 110 may determine whether to create the print data using the first creation processing or create the print data using the second creation processing, in accordance with the identified type of the recording medium.

The CPU 110 may create the color image excluding the dots at part of both the end portions of the color image C23 in the main scanning direction and the transport direction, respectively, and may create the print data on the basis of the created color image.

The user may include, in the print command, a command specifying the first gaps d11 and d12. The CPU 110 may create the background divided images W31 and W32 on the basis of the first gaps d11 and d12 specified by the received print command, and may create the divided print data D31 and D32 from the created background divided images W31 and W32. The CPU 110 may store, in the non-volatile storage device 130, an upper limit of the first gaps d11 and d12 specified by the received print command. The CPU 110 may create the background divided images W31 and W32 within a range smaller than the upper limit of the first gaps d11 and d12, and may create the divided print data D31 and D32 from the created background divided images W31 and W32. In this way, the print device 600 can inhibit the background divided images W31 and W32 from disappearing as a result of the first gaps d11 and d12 becoming too large.

Second Working Example

A second working example, which is an example of the first processing (step S19, step S23, refer to FIG. 5), will be explained with reference to FIG. 9. The second working example differs from the first working example (refer to FIG. 8) with respect to background divided images that are created from the background image W11. Hereinafter, an explanation of the processing that is the same as that of the first working example will be simplified.

First, in the first creation processing, (step S19, refer to FIG. 5), the CPU 110 creates background divided images W41 and W42 from the background image W11 shown in FIG. 4. As shown in step (A) of FIG. 9, in the background divided image W41, dot rows of the white ink are formed on a 4L+3-th row (L is an integer of zero or greater). Further, in the background divided image W41, similarly to the background divided image W31 (refer to step (A) of FIG. 8), of the background image W11, the dots are not formed at part of both end portions in the main scanning direction and both end portions in the transport direction, respectively. As shown in step (B) of FIG. 9, in the background divided image W42, dot rows of the white ink are formed on a 4L+1-th row, a 4L+2-th row and a 4L+4-th row. Further in the background divided image W42, similarly to the background divided image W32 (refer to step (B) of FIG. 8), of the background image W11, the dots are not formed at part of both the end portions in the main scanning direction and both the end portions in the transport direction, respectively.

The ink amount ratio of the background divided image W41 is smaller than 100% by an amount corresponding to both the end portions, in the main scanning direction and the transport direction, at which the dots are not formed. Further, the ink amount ratio of the background divided image W42 is smaller than 300% by an amount corresponding to both the end portions, in the main scanning direction and the transport direction, at which the dots are not formed. Further, the ink amount ratio of the background divided image W41 is smaller than the ink amount ratio of the background divided image W42.

Figure 9:
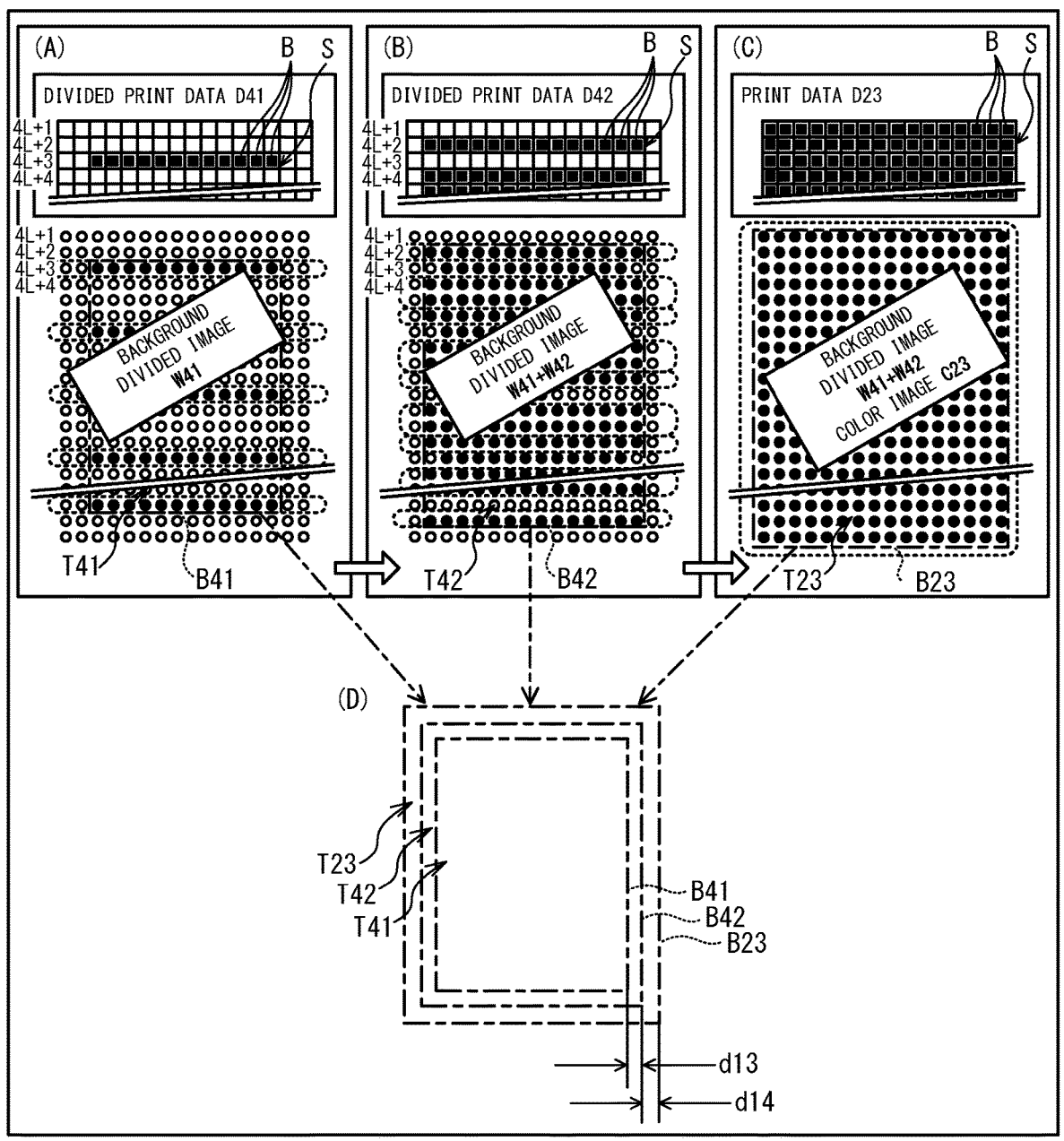
FIG. 9 is an explanatory diagram of a second working example.

The CPU 110 creates divided print data D41 and D42 from the background divided images W41 and W42 (refer to steps (A) and (B) of FIG. 9). Furthermore, the CPU 110 creates the print data D23 to print the color image C23 (refer to step (C) of FIG. 9). The color image C23 and the print data D23 are the same as in the first working example. Furthermore, the CPU 110 acquires, from the non-volatile storage device 130, the order information indicating the order when performing the printing on the basis of the created divided print data D41 and D42, and the created print data D23. In the second working example, in the order information, it is assumed that the divided print data D41 is set to be first in the printing order, the divided print data D42 is set to be second in the printing order, and the print data D23 is set to be third in the printing order. The CPU 110 sets the printing order for the divided print data D41 and D42, and the print data D23. Furthermore, the CPU 110 sets the standby time acquired in the processing at step S15 of the control processing (refer to FIG. 5) in the print data D23.

Next, the CPU 110 controls the printing mechanism 200 on the basis of the created divided print data D41 and D42 and the created print data D23, and executes the first print processing (step S23, refer to FIG. 5). In the first print processing, as shown in step (A) of FIG. 9, the CPU 110 discharges the white ink from the discharge heads 35 on the basis of the divided print data D41 that is first in the printing order, and prints the background divided image W41 on the first background layer. Next, as shown in step (B) of FIG. 9, the CPU 110 discharges the white ink from the discharge heads 35 on the basis of the divided print data D42 that is second in the printing order, and prints the background divided image W42 on the second background layer. Here, the dots of the background divided image W42 are formed in different positions from the dots of the background divided image W41.

Figure 8:
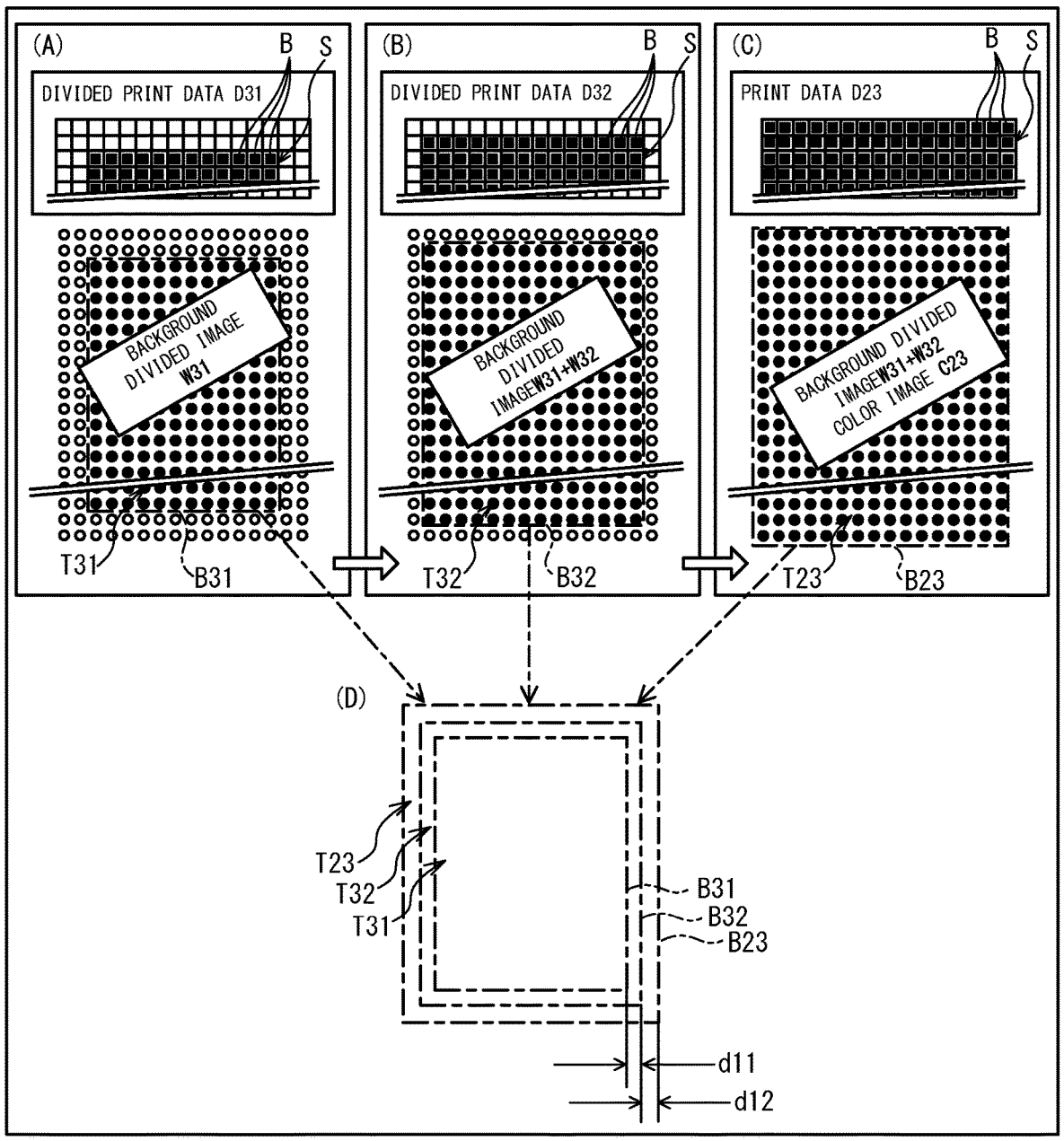
FIG. 8 is an explanatory diagram of a first working example.

Note that a positional relationship between a first discharge region T41 of the first background layer onto which the white ink that prints the background divided image W41 is discharged, and a second discharge region T42 of the second background layer onto which the white ink that prints the background divided image W42 is discharged is the same as in the first working example (refer to step (D) of FIG. 8). Thus, a first gap d13 between a first background boundary position B41 of the first discharge region T41 and a second background boundary position B42 of the second discharge region T42 matches the first gap d11 (refer to step (D) of FIG. 8) in the first working example, and is larger than the second gap d21 (refer to step (D) of FIG. 7).

Note that a detailed explanation of the first discharge region T41 is as follows. In step (A) of FIG. 9, it is illustrated that the dot rows are formed only on the 4L+3-th row, and the dot rows are not formed on the 4L+1-th row, the 4L+2-th row, and the 4L+4-th row. However, the size of the dots formed in actuality is larger than the size illustrated. Thus, the 4L+1-th row, the 4L+2-th row and the 4L+4-th row are filled in by the dots formed in the 4L+3-th row. As a result, as shown in step (D) of FIG. 9, the first discharge region T41 of the first background layer onto which the white ink is discharged in the printing of the background divided image W41 is a rectangular shape surrounding all of the 4L+3-th rows. Similarly, a detailed explanation of the second discharge region T42 is as follows. As shown in step (B) of FIG. 9, it is illustrated that the dot rows are formed only on the 4L+1-th row, the 4L+2-th row, and the 4L+4-th row, and are not formed on the 4L+3-th row. However, the 4L+3-th row is filled in by the dots formed on the 4L+1-th row, the 4L+2-th row, and the 4L+4-th row. Thus, as shown in step (D) of FIG. 9, the second discharge region T42 of the second background layer onto which the white ink is discharged in the printing of the background divided image S42 is a rectangular shape surrounding all of the 4L+1-th rows, the 4L+2-th rows, and the 4L+4-th rows. In this case, as described above, the first discharge region T41 is positioned further to the inside than the second discharge region T42.

Next, after the printing of the background divided image W42 is complete, the CPU 110 stands by for an amount of time corresponding to the standby time set in the print data D23. After that, as shown in step (C) of FIG. 9, the CPU 110 discharges the color inks from the discharge heads 35 on the basis of the print data D23 that is third in the printing order, and prints the color image C23. Note that the positional relationship between the second discharge region T42 of the second background layer onto which the white ink is discharged when printing the background divided image W42, and the color region T23 of the color layer onto which the color inks are discharged when printing the color image C23 is the same as in the first working example (refer to step (D) of FIG. 8). Thus, the first discharge region T41 is positioned further to the interior side of the region encompassed by the color boundary position B23 of the color image C23 than the second discharge region T42. Further, a first gap d14 between the second background boundary position B42 of the second discharge region T42 and the color boundary position B23 matches the first gap d12 (refer to step (D) of FIG. 8) in the first working example, and is larger than the second gap d22 (refer to step (D) of FIG. 7). Further, the ink amount ratio when the background divided images W41 and W42 are printed is smaller than the ink amount ratio of the color image C23.

Actions and Effects of Second Working Example

The CPU 110 causes the ink amount ratio of the background divided image W41 to be lower than that of the background divided image W42, and also forms the dots of each of the background divided images W41 and W42 in the mutually different positions. In this way, the print device 600 can inhibit bleeding of the white ink caused by the dots of each of the background divided images W41 and W42 being overlapped.

The CPU 110 sets the ink amount ratio of the background divided images W41 and W42 formed by the discharge of the white ink to be lower than that of the color image C23 formed by the discharge of the color inks. Thus, the print device 600 can suppress the shrinking of the recording medium by suppressing the ink amount of the white ink. Note that the color image C23 is printed in the superimposed manner on the background divided images W41 and W42. The background divided images W41 and W42 are covered by the color image C23. As a result, the print device 600 can suppress a deterioration in image quality caused by the low ink amount ratio of the background divided images W41 and W42.

In the second working example, the print device 600 may cause the background divided images W41 and W42 to have the same ink amount ratio. For example, in the background divided image W41, the white ink dots may be formed on the 4L+1-th row and the 4L+3-th row, and in the background divided image W42, the white ink dots may be formed on the 4L+2-th row and the 4L+4-th row.

Third Working Example

Figure 10:
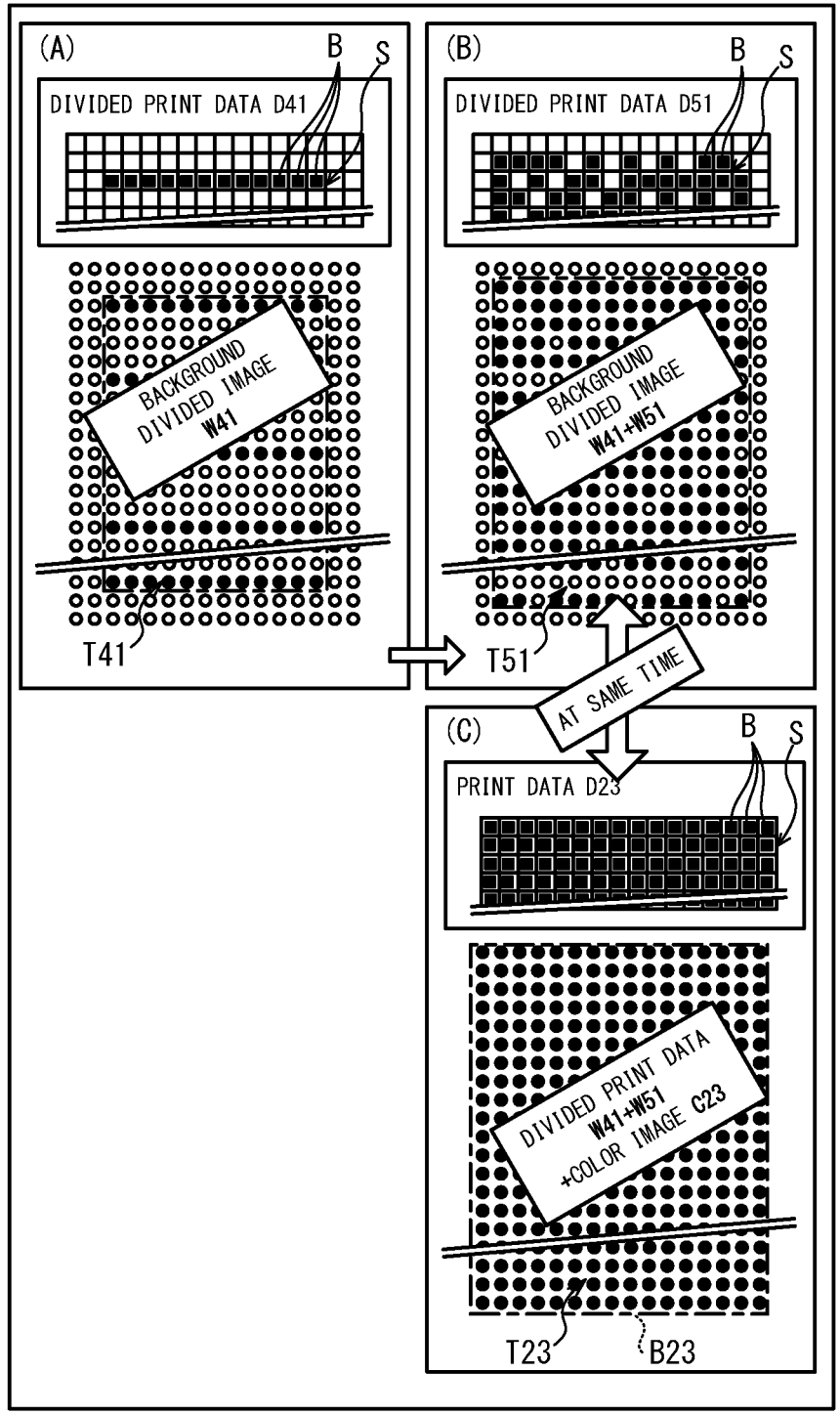
FIG. 10 is an explanatory diagram of a third working example.

A third working example, which is an example of the first processing (step S19, step S23, refer to FIG. 5), will be explained with reference to FIG. 10. The third working example differs from the second working example (refer to FIG. 9) with respect to background divided images that are created from the background image W11. Further, the third working example differs from the second working example with respect to a print timing of the color image C23. Hereinafter, an explanation of processing that is the same as that of the second working example will be simplified.

First, in the first creation processing (step S19, refer to FIG. 5), the CPU 110 creates the background divided image W41 and a background divided image W51 from the background image W11 shown in FIG. 4. As shown in step (A) of FIG. 10, the background divided image W41 is the same as that of the second working example (refer to step (A) of FIG. 9). On the other hand, as shown in step (B) of FIG. 10, in the background divided image W51, some of the dots of the background divided image W42 (refer to step (B) of FIG. 9) are randomly thinned out. The ink amount ratio of the background divided image W51 is smaller than that of the background divided image W42. As shown in steps (A) and (B) of FIG. 10, the CPU 110 creates the divided print data D41 and divided print data D51 from the background divided images W41 and W51. Further, as shown in step (C) of FIG. 10, the CPU 110 creates the print data D23 from the color image C23. Furthermore, the CPU 110 acquires, from the non-volatile storage device 130, the order information indicating the order when performing the printing on the basis of the created print data D41 and D51 and the created print data D23. Here, in the third working example, in order to print the background divided image W51 and the color image C23 at the same time, in the order information, it is assumed that the print data D41 is set to be first in the printing order, and the divided print data D51 and the print data D23 are set to be second in the printing order. The CPU 110 sets the printing order for the divided print data D41 and D51 and the print data D23.

Next, the CPU 110 controls the printing mechanism 200 on the basis of the created divided print data D41 and D51, and the created print data D23, and executes the first print processing (step S23, refer to FIG. 5). In the first print processing, as shown in step (A) of FIG. 10, the CPU 110 discharges the white ink from the discharge heads 35 on the basis of the divided print data D41 that is first in the printing order, and prints the background divided image W41 on the first background layer. Next, as shown in steps (B) and (C) of FIG. 10, the CPU 110 discharges the white ink from the discharge heads 35 on the basis of the divided print data D51 that is second in the printing order, and, at the same time, discharges the color inks from the discharge heads 35 on the basis of the print data D23 that is second in the printing order. At this time, the CPU 110 uses the print data D23 to which an offset amount required for printing the color image on the background image in the superimposed manner is applied. In this way, the CPU 110 performs the printing of the background divided image W51 with respect to the second background layer, and the printing of the color image C23 with respect to the color layer in a superimposed manner, on the recording medium. Note that the first discharge region T41 onto which the white ink is discharged when printing the background divided image W41 is positioned further to the inside than a second discharge region T51 onto which the white ink is discharged when printing the background divided image W51. In other word, the first discharge region T41 is positioned further to the interior side of the region encompassed by the color boundary position B23 of the color image C23 than the second discharge region T51.

Actions and Effects of Third Working Example

The print device 600 performs the printing of the background divided image W51 and the printing of the color image C23 at the same time. In this case, the print device 600 discharge the color inks and print the color image C23 before a shrinkage amount of the recording medium due to drying of the white ink discharged when printing the background divided image W51 becomes large. Thus, the print device 600 can discharge the color inks in a state in which the shrinkage amount of the recording medium is small, and can thus reduce the possibility of the color inks being displaced with respect to the white ink.

The print device 600 prints the background divided image W51 obtained by randomly removing some of the dots of the background divided image W42. In this case, the amount of white ink required for printing the background divided image W51 can be reduced compared to the amount of white ink required for printing the background divided image W42. Thus, the print device 600 can inhibit the bleeding of the white ink, by suppressing the ink amount of the white ink.

Fourth Working Example

A fourth working example, which is an example of the first processing (step S19, step S23, refer to FIG. 5), will be explained with reference to FIG. 11 and FIG. 12. In the fourth working example, a case is described in which background divided images W61 and W62 are created from a background image W12 and are printed, and after that, a color image C61 is printed on the same position as the background image W12. As shown in step (A) of FIG. 11, the background image W12 includes rectangular partial images W121, W122, and W123. As shown in FIG. 12, the color image C61 includes partial images C611, C612, and C613 respectively corresponding to the partial images W121, W122, and W123 (refer to step (A) of FIG. 11) of the background image W12.

First, in the first creation processing (step S19, refer to FIG. 5), the CPU 110 calculates a position of a center of gravity G of a plurality of dots configured the background image W12 (hereinafter referred to the center of gravity G of the background image W12). Various known methods can be applied to the method for calculating the position of the center of gravity of an image. For example, the CPU 110 calculates coordinates (x,y) indicating the position of the center of gravity G of the background image W12 using the following expression. Here, a number of dots included in the background image W12 is denoted by i, an x coordinate of an i-th dot is denoted by $x_i$, a white ink amount for forming the dot whose x coordinate is $x_i$ is denoted by $Bx_i$, a y coordinate of the i-th dot is denoted by $y_i$, and a white ink amount for forming the dot whose y coordinate is $y_i$ is denoted by $By_i$.

$$(x, y) = \left( \frac{\sum_{i=1}^{n}(x_i \cdot Bx_i)}{\sum_{i=1}^{n} Bx_i}, \frac{\sum_{i=1}^{n}(y_i \cdot By_i)}{\sum_{i=1}^{n} By_i} \right) \quad \text{Expression 1}$$

Figure 11:
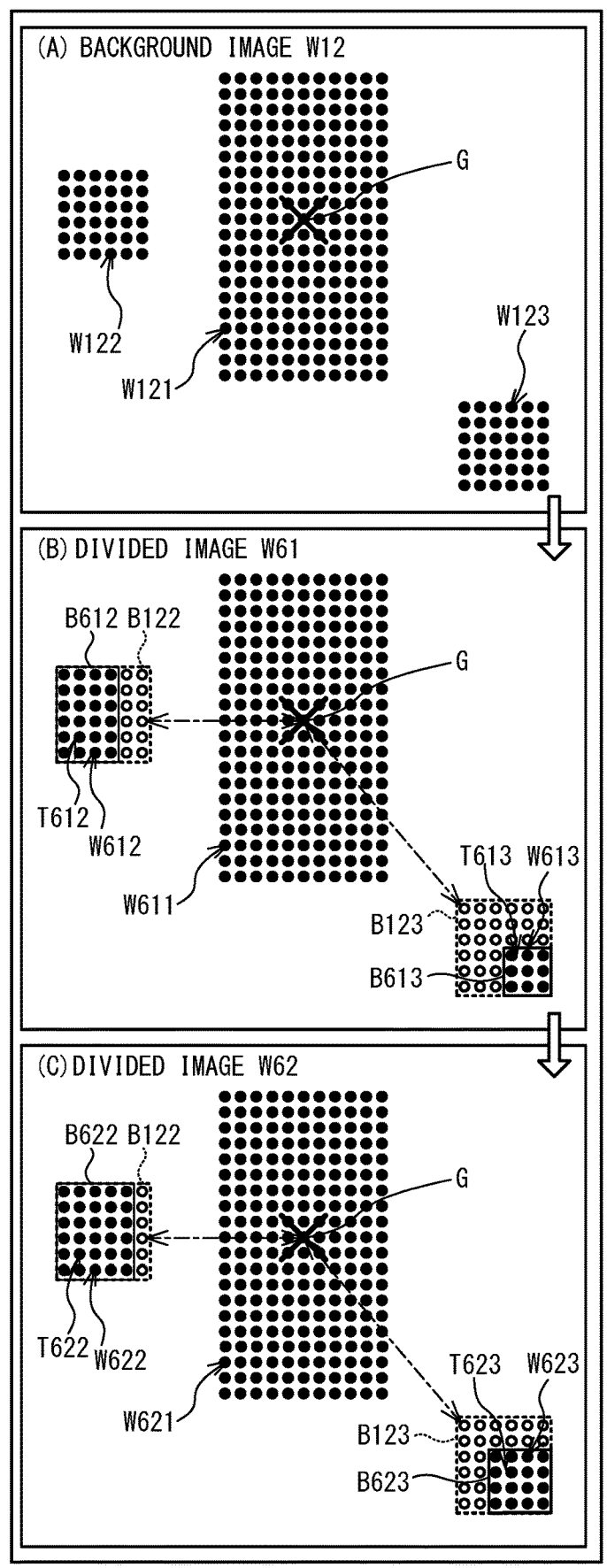
FIG. 11 is an explanatory diagram of a fourth working example (a background image W12, background divided images W61 and W62)
Figure 12:
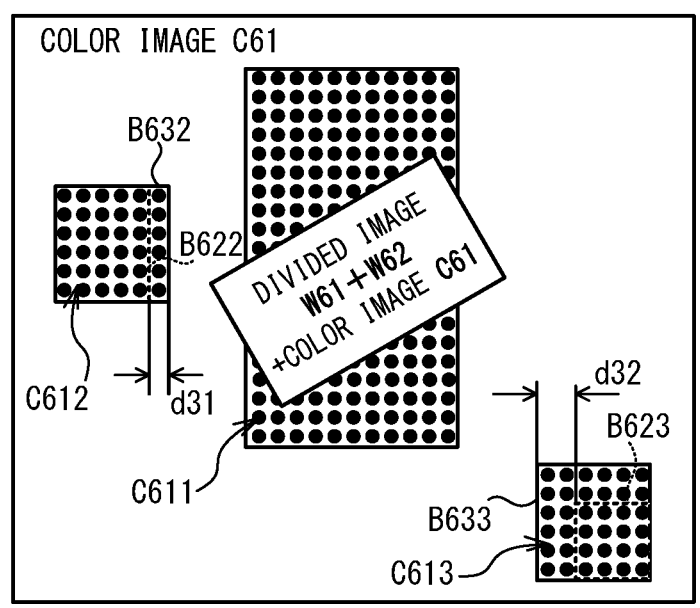
FIG. 12 is an explanatory diagram of the fourth working example (a color image C61).

Next, for the partial image W121, which overlaps the center of gravity G of the background image W12, the CPU 110 causes a partial image 611 to be part of the background divided image W61 (refer to step (B) of FIG. 11) as it is, without removing any of the dots. Next, for the partial images W122 and W123, which do not overlap the center of gravity G of the background image W12, the CPU 110 creates partial images W612 and W613 (refer to step (B) of FIG. 11) from which some of the dots are removed using a method described below, and causes the created partial images W612 and W613 to be part of the background divided image W61 shown in step (B) of FIG. 11.

The method for removing the dots from part of the partial image W122 is as described as follows. The CPU 110 defines virtual straight lines extending between the center of gravity G and each of the dots of the partial image W122. Of a boundary position B122 of the partial image W122, the CPU 110 extracts sections intersecting the virtual straight lines (referred to as intersections). The CPU 110 moves the extracted intersections of the boundary position B122 to the inside of the partial image W122. The CPU 110 causes the dots included in a portion encompassed by the boundary position B122 after the move (referred to as a boundary position B612) to be the dots of the partial image W612. In other words, of the dots of the partial image W122, the dots excluded from the partial image W612 by the movement of the boundary position B122 are removed. The CPU 110 removes some of the dots of the partial image W123 using the same method, and determines the partial image W613 encompassed by a boundary position B613.

Further, in the above operation, the greater the distance from the center of gravity G to the boundary position B122 and a boundary position B123 of the partial image W123, the larger the CPU 110 causes a movement amount of the boundary position B122 and a movement amount of the boundary position B123 to be. For example, in step (B) of FIG. 11, a distance between the boundary position B123 and the center of gravity G is greater than a distance between the boundary position B122 and the center of gravity G. Thus, the CPU 110 makes the movement amount of the boundary position B123 larger than the movement amount of the boundary position B122.

Furthermore, the CPU 110 creates the background divided image W62 shown in step (C) of FIG. 11, using the same method as when determining the background divided image W61. The background divided image W62 includes partial images W621, W622, and W623. The partial images W621, W622, and W623 correspond, respectively, to the partial images W611, W612, and W613 of the background divided image W61 (refer to step (B) of FIG. 11). A movement amount when moving the boundary positions B122 and B123 is different when creating each of the background divided image W61 and the background divided image W62. The movement amount when moving the boundary position B122 in order to create the partial image W622 (refer to step (C) of FIG. 11) is smaller than the movement amount when moving the boundary position B122 in order to create the partial image W612 (refer to step (B) of FIG. 11). Similarly, the movement amount when moving the boundary position B123 in order to create the partial image W623 (refer to step (C) FIG. 11) is smaller than the movement amount when moving the boundary position B123 in order to create the partial image W613 (refer to step (B) of FIG. 11).

Next, in the first creation processing (step S19, refer to FIG. 5), the CPU 110 creates the print data for printing the determined background divided images W61 and W62, and the print data for printing the color image C61. Next, the CPU 110 controls the printing mechanism 200 on the basis of the created print data, and executes the first print processing (step S23, refer to FIG. 5). In the first print processing, the CPU 110 prints the background divided images W61 and W62 in order. Here, the first discharge region of the first background layer on which the partial image W612 of the background divided image W61 is to be printed is disposed further to the inside of the partial image W622 than the second discharge region of the second background layer on which the partial image W622 of the background divided image W62 is to be printed. Similarly, the first discharge region of the first background layer on which the partial image W613 of the background divided image W61 is to be printed is disposed further to the inside of the partial image W623 than the second discharge region of the second background layer on which the partial image W623 of the background divided image W62 is to be printed.

Next, the CPU 110 prints the color image C61 so as to be superimposed on the background divided images W61 and W62. As shown in FIG. 12, a gap d31 between a boundary position B622 of the partial image W622 (refer to step (C) of FIG. 11) and a boundary position B632 of the partial image C612 of the color image C61, and a gap d32 between a boundary position B623 of the partial image W623 (refer to step (C) of FIG. 11) and a boundary position B633 of the partial image C613 of the color image C61 are defined. In this case, the gap d32 between the boundary positions B623 and B633 for which a distance to the center of gravity G is greater, is larger than the gap d31 between the boundary positions B622 and B632 for which a distance to the center of gravity G is smaller. Further, a first discharge region T612 (refer to step (B) of FIG. 11) onto which the white ink is discharged when printing the partial image W612 (refer to step (B) of FIG. 11) is positioned further to the inside than a second discharge region T622 (refer to step (C) of FIG. 11) onto which the white ink is discharged when printing the partial image W622 (refer to step (C) of FIG. 11). In other words, the first discharge region T612 is positioned further to the interior side of a region encompassed by the boundary position B632 of the partial image C612 of the color image C61 (refer to FIG. 12) than the second discharge region T622. In a similar manner, a first discharge region T613 (refer to step (B) of FIG. 11) onto which the white ink is discharged when printing the partial image W613 (refer to step (B) of FIG. 11) is positioned further to the inside than a second discharge region T623 (refer to step (C) of FIG. 11) onto which the white ink is discharged when printing the partial image W623 (refer to step (C) of FIG. 11). In other words, the first discharge region T613 is positioned further to the interior side of a region encompassed by the boundary position B633 of the partial image C613 of the color image C61 (refer to FIG. 12) than the second discharge region T623.

Actions and Effects of the Fourth Working Example

A displacement in a positional relationship between the background image W12 and the color image C61 when the background image W12 is printed becomes larger the more the background image W12 is separated from the position of the center of gravity G. Thus, the print device 600 causes the gap between the boundary positions of each of the background image and the color image to be larger the more the position is separated from the center of gravity G. In this way, even when an amount of displacement in the positional relationship between the background image W12 and the color image C61 changes in accordance with the distance from the center of gravity G, the print device 600 can reduce a possibility of the color ink becoming displaced with respect to the white ink and the white ink becoming exposed.

Other Modified Examples

The present disclosure is not limited to the above-described embodiments, and various modification are possible. The print data creation program is not limited to being executed by the CPU 110 of the print device 600. For example, the print data creation program may executed by a CPU of a PC, a server, or the like (hereinafter referred to as a control terminal) connected to the print device 600. In this case, the print data created by executing the print data creation program may be output from the control terminal to the print device 600. The print device 600 may perform the print processing on the basis of the print data output from the control terminal.

A base coat agent that is applied before the ink is discharged onto the recording medium may be discharged in place of the white ink. The print command received from the operation portion 150 may include a command specifying one of the first working example to the fourth working example. The print device 600 may create the print data and perform the print processing on the basis of the specified one of the first working example to fourth working example.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A print device comprising:
a background head configured to discharge a background ink onto a recording medium;
a color head configured to discharge a color ink onto the recording medium;
a processor; and
a memory configured to store computer-readable instructions that, when executed by the processor, perform processes including:
dividing the background ink into a plurality of layers including a first background layer and a second background layer, and discharging the background ink from the background head in an order of the first background layer and the second background layer, and
causing a first discharge region of the first background layer to be further to an inner side than a second discharge region of the second background layer.

2. The print device according to claim 1, wherein
the memory further stores computer-readable instructions that, when executed by the processor, perform processes including:
causing the background ink to be discharged from the background head onto the second discharge region further to the inner side than a color region onto which the color ink is discharged.

3. The print device according to claim 2, wherein
the memory further stores computer-readable instructions that, when executed by the processor, perform processes including:
causing a gap between a color boundary position and a second background boundary position to be a first gap, when a first print method is acquired, the color boundary position being a position between a region onto which the color ink is not discharged and the color region, and the second background boundary position being a position between a region onto which the background ink is not discharged and the second discharge region, and
causing the gap between the color boundary position and the second background boundary position to be a second gap, when a second print method is acquired, the second gap being smaller than the first gap.

4. The print device according to claim 2, wherein
the memory further stores computer-readable instructions that, when executed by the processor, perform processes including:
increasing a gap between a color boundary position and a second background boundary position when a distance from a position of a center of gravity of an image formed on the recording medium by the discharge of the background ink and the color ink becomes large, the color boundary position being a position between a region onto which the color ink is not discharged and the color region, and the second background boundary position being a position between a region onto which the background ink is not discharged and the second discharge region.

5. The print device according to claim 2, wherein
the memory further stores computer-readable instructions that, when executed by the processor, perform processes including:
increasing a gap between a color boundary position and a second background boundary position when an amount of the background ink discharged onto the first discharge region and the second discharge region increases, the color boundary position being a position between a region onto which the color ink is not discharged and the color region, and the second background boundary position being a position between a region onto which the background ink is not discharged and the second discharge region.

6. The print device according to claim 1, wherein
the memory further stores computer-readable instructions that, when executed by the processor, perform processes including:
causing an image to be formed on the recording medium by the discharge of the background ink to be a lower resolution than an image to be formed on the recording medium by the discharge of the color ink.

7. The print device according to claim 1, wherein
the memory further stores computer-readable instructions that, when executed by the processor, perform processes including:
causing the background head and the color head to discharge the background ink to be discharged onto the second background layer at the same time as the color ink.

8. The print device according to claim 1, wherein
the memory further stores computer-readable instructions that, when executed by the processor, perform processes including:
causing a first background image to be formed on the first background layer to be a lower resolution than a second background image to be formed on the second background layer, and forming an image from which some of dots of the second background image are thinned out.

9. The print device according to claim 1, wherein
the memory further stores computer-readable instructions that, when executed by the processor, perform processes including:
causing a first background image to be formed on the first background layer to be a lower resolution than a second background image to be formed on the second background layer, and forming the first background image and the second background image in different positions.

10. A non-transitory computer-readable medium storing computer-readable instructions that, when executed by a computer that controls a background head configured to discharge a background ink onto a recording medium and a color head configured to discharge a color ink onto the recording medium, cause the computer to perform processes comprising:
dividing the background ink into a plurality of layers including a first background layer and a second background layer, and discharging the background ink from the background head, and
causing a first discharge region of the first background layer to be further to an inner side than a second discharge region of the second background layer.

11. A print method controlling a background head configured to discharge a background ink onto a recording medium and a color head configured to discharge a color ink onto the recording medium, the method comprising:
dividing the background ink into a plurality of layers including a first background layer and a second background layer, and discharging the background ink from the background head, and
causing a first discharge region of the first background layer to be further to an inner side than a second discharge region of the second background layer.

* * * * *